(12) United States Patent
Seo et al.

(10) Patent No.: US 11,734,891 B2
(45) Date of Patent: Aug. 22, 2023

(54) SKELETON-BASED DYNAMIC POINT CLOUD ESTIMATION SYSTEM FOR SEQUENCE COMPRESSION

(71) Applicant: KWANGWOON UNIVERSITY INDUSTRY—ACADEMIC COLLABORATION FOUNDATION, Seoul (KR)

(72) Inventors: Young Ho Seo, Seoul (KR); Kyung Jin Kim, Seoul (KR)

(73) Assignee: KWANGWOON UNIVERSITY INDUSTRY—ACADEMIC COLLABORATION FOUNDATION, Seoul (KR)

( * ) Notice: Subject to any disclaimer, the term of this patent is extended or adjusted under 35 U.S.C. 154(b) by 287 days.

(21) Appl. No.: 17/332,545

(22) Filed: May 27, 2021

(65) Prior Publication Data
US 2022/0189119 A1 Jun. 16, 2022

(30) Foreign Application Priority Data

Dec. 15, 2020 (KR) .................. 10-2020-0174946
May 13, 2021 (KR) .................. 10-2021-0062187

(51) Int. Cl.
*G06T 17/20* (2006.01)
*G06T 9/40* (2006.01)
*G06T 9/00* (2006.01)

(52) U.S. Cl.
CPC ............ *G06T 17/205* (2013.01); *G06T 9/001* (2013.01); *G06T 9/40* (2013.01)

(58) Field of Classification Search
None
See application file for complete search history.

(56) References Cited

U.S. PATENT DOCUMENTS

| | | | |
|---|---|---|---|
| 11,410,387 B1 * | 8/2022 | Alderman | G06T 17/20 |
| 11,450,030 B2 * | 9/2022 | Mammou | G06T 7/162 |
| 11,451,758 B1 * | 9/2022 | Chaurasia | G06T 5/005 |
| 11,494,947 B2 * | 11/2022 | Mammou | G01S 7/4808 |
| 11,501,488 B2 * | 11/2022 | Garcia | G06T 15/20 |
| 11,508,095 B2 * | 11/2022 | Mammou | G06T 9/001 |
| 11,552,651 B2 * | 1/2023 | Mammou | H04N 19/436 |

(Continued)

OTHER PUBLICATIONS

Pavez et al. ("Dynamic polygon clouds: Representation and compression for VR/AR.", APSIPA Transactions on Signal and Information Processing 7, 2018, pp. 1-22, vol. 7). (Year: 2018).*

(Continued)

*Primary Examiner* — Anand P Bhatnagar
(74) *Attorney, Agent, or Firm* — NKL Law; Jae Youn Kim

(57) ABSTRACT

Disclosed is a skeleton-based dynamic point cloud estimation system for sequence compression, capable of generating a three-dimensional skeleton and a motion vector thereof from a group of point cloud frames to estimate a point cloud of a next frame, and compressing a point cloud sequence by obtaining a residual between the estimated point cloud and an original point cloud. Since the point cloud is estimated by using the motion vector of the skeleton, and the sequence is compressed by using a difference from an original value as the residual, an amount of point clouds to be input to a compressor is significantly reduced, so that compression efficiency is improved.

12 Claims, 13 Drawing Sheets

(56) References Cited

U.S. PATENT DOCUMENTS

| | | | | |
|---|---|---|---|---|
| 11,573,317 | B2* | 2/2023 | Thoresen | G06T 19/006 |
| 2021/0097726 | A1* | 4/2021 | Mammou | G06F 16/9027 |
| 2021/0233305 | A1* | 7/2021 | Garcia | G06T 19/006 |
| 2021/0233312 | A1* | 7/2021 | Noris | H04N 13/279 |
| 2021/0318428 | A1* | 10/2021 | Thoresen | G06T 19/006 |
| 2022/0189113 | A1* | 6/2022 | Seo | G06T 17/20 |
| 2023/0095473 | A1* | 3/2023 | Mammou | G06F 16/9027 |
| | | | | 382/232 |

OTHER PUBLICATIONS

Pavez Eduardo et al. "Dynamic polygon clouds: Representation and compression for VR/AR.", APSIPA Transactions on Signal and Information Processing 7, 2018, pp. 1-22, vol. 7.

Julius Kammerl et al. "Real-time compression of point cloud streams." 2012 IEEE International Conference on Robotics and Automation, IEEE, 2012.

Sebastian Schwarz et al. "Emerging MPEG standards for point cloud compression.", IEEE Journal on Emerging and Selected Topics in Circuits and Systems 9.1, Mar. 1, 2018, pp. 133-148, vol. 9, No. 1.

Jonathon Shlens, "A tutorial on principal component analysis.", arXiv preprint arXiv, Apr. 3, 2014, pp. 1-12.

Zhe Cao et al. "OpenPose: realtime multi-person 2D pose estimation using Part Affinity Fields.", IEEE Transactions on pattern analysis and machine intelligence, 2018, pp. 1-14.

* cited by examiner

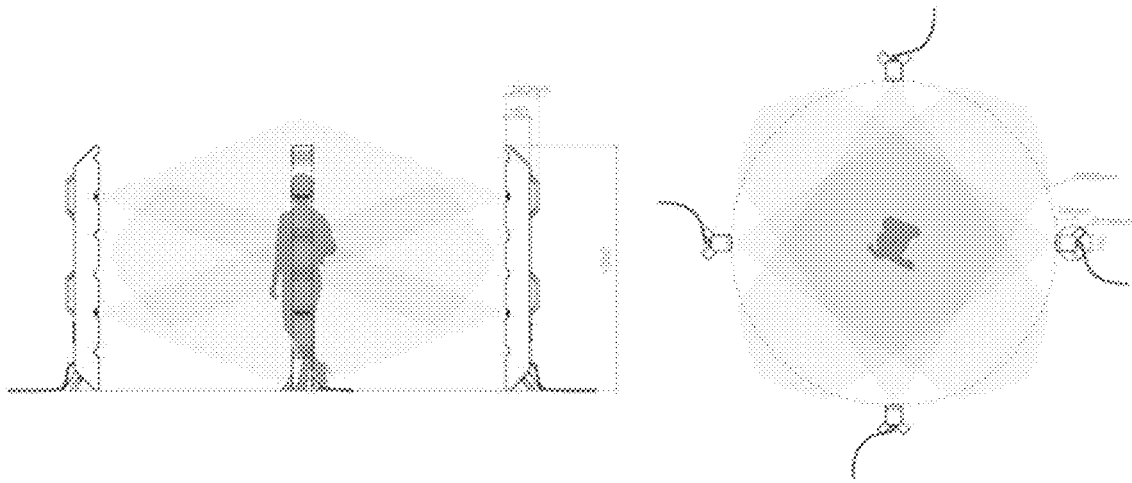
FIG. 5A  FIG. 5B
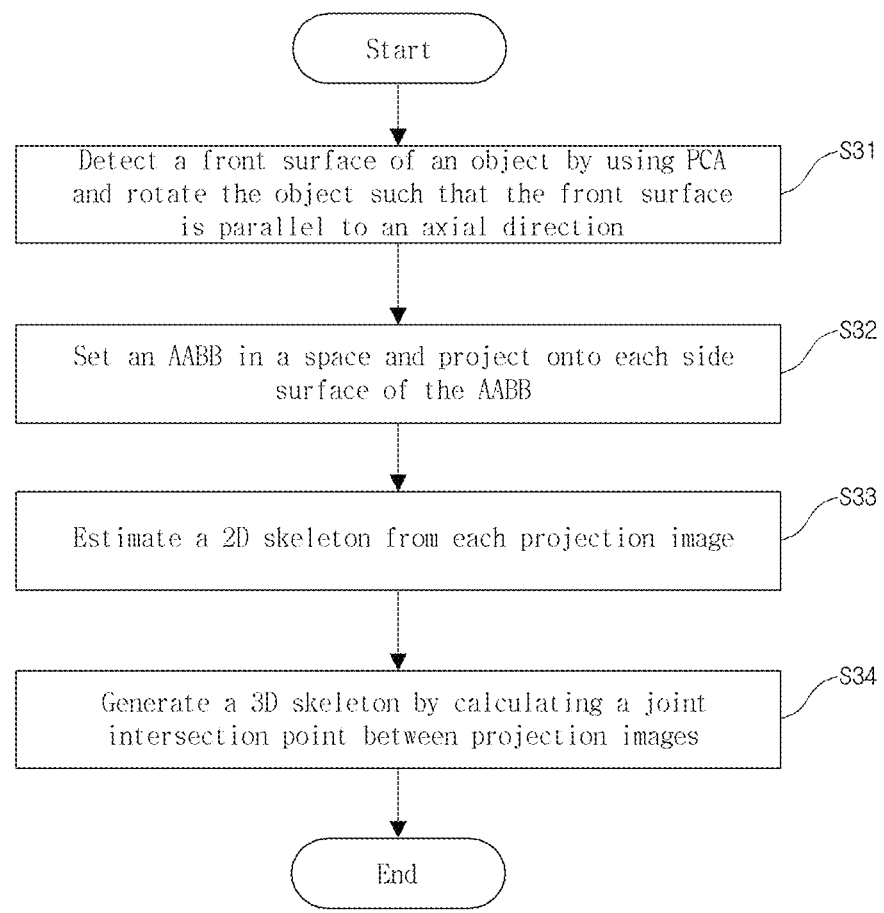
FIG. 6

SKELETON-BASED DYNAMIC POINT CLOUD ESTIMATION SYSTEM FOR SEQUENCE COMPRESSION

CROSS-REFERENCE TO RELATED APPLICATIONS

This application claims priority to and the benefit of Korean Patent Application No. 10-2020-0174946, filed on Dec. 15, 2020 and Korean Patent Application 10-2021-0062187, filed on May 13, 2021, the disclosures of which are incorporated herein by references in their entireties.

BACKGROUND OF THE INVENTION

1. Field of the Invention

The present invention relates to a skeleton-based dynamic point cloud estimation system for sequence compression, capable of inferring correlation between dynamic point clouds by using a three-dimensional skeleton, comparing skeletons extracted from point cloud frames with each other to generate a motion vector of the skeleton, and rigging and deforming a point cloud of a previous frame by using the motion vector to estimate a point cloud of a next frame.

In addition, the present invention relates to a skeleton-based dynamic point cloud estimation system for sequence compression, capable of generating a three-dimensional skeleton and a motion vector thereof from a group of point cloud frames to estimate a point cloud of a next frame, and compressing a point cloud sequence by obtaining a residual between the estimated point cloud and an original point cloud.

2. Description of the Related Art

Recently, as virtual reality and augmented reality (AR) industries become active, three-dimensional (3D) video content techniques that provide realistic experiences from various viewpoints are also being actively developed. The 3D video content is applied to various application fields from a game field to an image service, a medical field, an education field, and the like. When 3D data generated by a user is consumed through a certain device, techniques related to compression and restoration for smooth transmission and storage of the data are spotlighted as an important issue.

As representative 3D data for a virtual object, there is a point cloud that represents a surface of the object in the form of a point. The data basically includes three-dimensional coordinate information for each point and texture coordinate information, and additionally includes color information, surface normal information, map information, and the like according to an applied field. Since the data uses hundreds of thousands of points or millions of points for visualizing information, the data requires much more bits than a conventional two-dimensional (2D) video, so that compression and restoration techniques are essential (see Non-patent literature 1 and Non-patent literature 2).

As a conventional research related to compression of a dynamic point cloud, first, there is a scheme of performing 2D video conversion and performing compression by using a video codec (see Non-patent literature 3). In order to convert 3D data into 2D data, a projection process is required. In order to project on a specific plane, a rectangular parallelepiped box including an object is set, and points are clustered and divided into patches by using a location in a space and normal vector information. Each of the patches is projected onto a nearest plane and arranged in a rectangular atlas. Two images, in which one image includes geometric information and the remaining image includes texture information, are output per frame, and this sequence is compressed through a video codec (see Non-patent literature 3).

Next, there is a point cloud compression scheme using an octree. Although sparse voxel octrees (SVOs) were first used to represent geometry of three-dimensional objects, SVOs are also used for compression by using octree serialization of point clouds. During intra-coding, an amount of data is reduced by removing spatially redundant points in the point cloud, and temporally redundant points are processed and compressed through an XOR operation on an octree serialization stream between frames.

Motion prediction and compensation algorithms, which serve an important role in improving sequence compression performance, may also be applied to point cloud data A point cloud motion estimation algorithm is used to divide a point cloud into voxel blocks and perform motion estimation by using a motion vector with a replaceable voxel block in an intra-coded frame. As another scheme, 3D coordinates and color signals of a point cloud are plotted in a graph as vertex signals, and motion estimation is performed by using spectral graph wavelet descriptors.

(Non-patent literature 1) Pavez, Eduardo, et al. "Dynamic polygon clouds: Representation and compression for VR/AR." APSIPA Transactions on Signal and Information Processing 7 (2018).

(Non-patent literature 2) Kammerl, Julius, et al. "Real-time compression of point cloud streams." 2012 IEEE International Conference on Robotics and Automation. IEEE, 2012.

(Non-patent literature 3) Schwarz, Sebastian, et al. "Emerging MPEG standards for point cloud compression." IEEE Journal on Emerging and Selected Topics in Circuits and Systems 9.1 (2018): 133-148.

(Non-patent literature 4) Shlens, Jonathon. "A tutorial on principal component analysis." arXiv preprint arXiv:1404.1100 (2014).

(Non-patent literature 5) Cao, Zhe, et al. "OpenPose: real-time multi-person 2D pose estimation using Part Affinity Fields." arXiv preprint arXiv:1812.08008 (2018).

SUMMARY OF THE INVENTION

To solve the problems described above, an object of the present invention is to provide a skeleton-based dynamic point cloud estimation system for sequence compression, capable of inferring correlation between dynamic point clouds by using a three-dimensional skeleton, comparing skeletons extracted from point cloud frames with each other to generate a motion vector of the skeleton, and rigging and deforming a point cloud of a previous frame by using the motion vector to estimate a point cloud of a next frame.

In addition, an object of the present invention is to provide a skeleton-based dynamic point cloud estimation system for sequence compression, capable of generating a three-dimensional skeleton and a motion vector thereof from a group of point cloud frames to estimate a point cloud of a next frame, and compressing a point cloud sequence by obtaining a residual between the estimated point cloud and an original point cloud.

To achieve the objects described above, according to the present invention, there is provided a skeleton-based dynamic point cloud estimation system for sequence compression, the skeleton-based dynamic point cloud estimation system including: a frame acquisition unit for acquiring consecutive frames of a multiview color-depth video; a point cloud acquisition unit for acquiring a three-dimensional point cloud from a multiview frame; a skeleton extraction unit for extracting a three-dimensional skeleton from the three-dimensional point cloud; a mesh conversion unit for converting the three-dimensional point cloud into a mesh; a mesh rigging unit for rigging, when a frame is a key frame, a mesh of the frame to a three-dimensional skeleton of the frame; a motion extraction unit for extracting, when a frame is a non-key frame, a motion vector from three-dimensional skeletons of the frame and the key frame; a mesh deformation unit for deforming a mesh of the key frame by using the motion vector; and a residual calculation unit for calculating a residual between a mesh of the non-key frame and the deformed mesh.

In addition, according to the skeleton-based dynamic point cloud estimation system for the sequence compression of the present invention, the point cloud acquisition unit may generate a point cloud of each viewpoint from a color-depth video of each viewpoint, and may match the point cloud of each viewpoint by using a camera parameter of each viewpoint to acquire an integrated three-dimensional point cloud.

In addition, according to the skeleton-based dynamic point cloud estimation system for the sequence compression of the present invention, the skeleton extraction unit may project the integrated three-dimensional point cloud in a plurality of directions to acquire projection images, may acquire a two-dimensional skeleton image from each of the projection images, and may restore the two-dimensional skeleton images to generate the three-dimensional skeleton.

In addition, according to the skeleton-based dynamic point cloud estimation system for the sequence compression of the present invention, the skeleton extraction unit may acquire the two-dimensional skeleton image by applying each of the projection images to an OpenPose library.

In addition, according to the skeleton-based dynamic point cloud estimation system for the sequence compression of the present invention, the skeleton extraction unit may detect a front surface of the object by applying principal component analysis (PCA) to the integrated three-dimensional point cloud, may rotate an object such that the front surface of the object is parallel to an axial direction, may set an axis-aligned bounding box (AABB) on the object, may project onto a plane of each side surface of the AABB, may acquire the two-dimensional skeleton images from the projection images, may restore the two-dimensional skeleton images, may form an intersection point by drawing a straight line from each of joints of the restored images through a center among the restored images, and may average the intersection points to obtain a joint having three-dimensional coordinates.

In addition, according to the skeleton-based dynamic point cloud estimation system for the sequence compression of the present invention, the mesh conversion unit may quantize an integrated three-dimensional point cloud, and may convert the quantized point cloud into the mesh.

In addition, according to the skeleton-based dynamic point cloud estimation system for the sequence compression of the present invention, the mesh conversion unit may quantize the point cloud by using an octree structure.

In addition, according to the skeleton-based dynamic point cloud estimation system for the sequence compression of the present invention, the mesh conversion unit may convert the point cloud into the mesh by using Poisson surface reconstruction.

In addition, according to the skeleton-based dynamic point cloud estimation system for the sequence compression of the present invention, the motion extraction unit may calculate, as the motion vector, a difference vector between each of joints of a skeleton of the key frame and a corresponding joint of a skeleton of the non-key frame.

In addition, according to the skeleton-based dynamic point cloud estimation system for the sequence compression of the present invention, the mesh conversion unit may set a skinning weight for the skeleton, may obtain a coordinate transformation matrix, and may deform the mesh of the key frame by using the skinning weight and the coordinate transformation matrix.

In addition, according to the skeleton-based dynamic point cloud estimation system for the sequence compression of the present invention, the skinning weight may be set to be closer to a value of 1 as becoming closer to a center of a bone of the skeleton, and may be set to be closer to 0 as becoming closer to a joint.

In addition, according to the skeleton-based dynamic point cloud estimation system for the sequence compression of the present invention, the coordinate transformation matrix may include a parallel translation matrix T and a rotation matrix R, and may be deformed by Formula 1:

$$X' = W(R(X - j_{2,t}) + j_{2,t+1}),$$

wherein X is coordinates of a point cloud before deformation, X' is coordinates after deformation, W is a skinning weight, $j_{2,t}$ is coordinates of a joint of a key frame, and $j_{2,t+1}$ is coordinates of a joint of a non-key frame.

As described above, according to the skeleton-based dynamic point cloud estimation system for the sequence compression of the present invention, since the point cloud is estimated by using the motion vector of the skeleton, and the sequence is compressed by using a difference from an original value as the residual, an amount of point clouds to be input to a compressor can be significantly reduced, so that compression efficiency can be improved.

BRIEF DESCRIPTION OF THE DRAWINGS

FIGS. 5A-5B are views illustrating a configuration of a system for acquiring a dynamic point cloud sequence according to one embodiment of the present invention, wherein FIG. 5A is a side view, and FIG. 5B is a top view.

FIG. 6 is a flowchart for describing 3D skeleton extraction according to one embodiment of the present invention.

FIGS. 11A-11C are view illustrating a skinning weight effect on deformation according to one embodiment of the present invention, wherein FIG. 11A shows a mesh and a skeleton of a key frame, FIG. 11B shows a deformation result when a skinning weight is not applied, and FIG. 11C shows a deformation result when the skinning weight is applied.

FIGS. 14A-14B are views for describing a scheme of generating a residual of a 3D point cloud by using skeleton prediction, wherein FIG. 14A shows a simple frame-specific residual calculation scheme, and FIG. 14B shows a scheme according to the present invention.

DETAILED DESCRIPTION OF THE INVENTION

Figure 1:
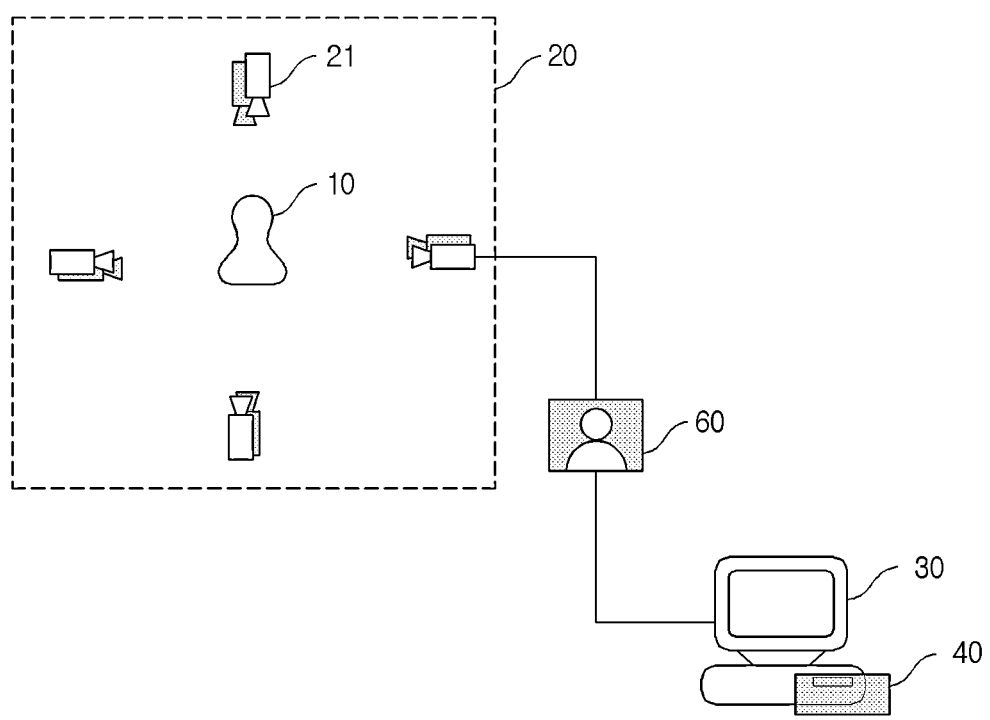
FIG. 1 is a block diagram showing an entire system for implementing the present invention.

Hereinafter, specific details for implementing the present invention will be described with reference to the drawings.

In addition, in describing the present invention, the same parts will be denoted by the same reference numerals, and redundant descriptions thereof will be omitted.

First, examples of a configuration of an entire system for implementing the present invention will be described with reference to FIG. 1.

As shown in FIG. 1, a dynamic point cloud estimation method according to the present invention may be implemented as a program system on a computer terminal 30, which is configured to receive multiview depth and color (RGB, etc.) images 60 captured by a distributed camera system 20 to estimate a dynamic point cloud. In other words, the dynamic point cloud estimation method may be configured as a program so as to be installed and executed in the computer terminal 30. The program installed in the computer terminal 30 may operate as a single program system 40.

Meanwhile, as another embodiment, the dynamic point cloud estimation method may be configured and implemented as a single electronic circuit such as an application-specific integrated circuit (ASIC) in addition to being configured as a program to operate on a general-purpose computer. Alternatively, the dynamic point cloud estimation method may be developed as a dedicated computer terminal 30 for exclusively processing only an operation of estimating a dynamic point cloud from multiview depth and color images. This will be referred to as a dynamic point cloud estimation system 40. Other possible embodiments may also be implemented.

Meanwhile, the distributed camera system 20 may include a plurality of color-depth (RGB-D) cameras 21 for capturing an object 10 at different viewpoints.

In addition, each of the RGB-D cameras 21 may be a camera for acquiring color and depth videos (or an RGB-D video) by measuring color information and depth information. Preferably, the RGB-D camera 21 may be a Kinect camera. Through the RGB-D camera 21, the color and depth videos may include two-dimensional (2D) pixels, and each of the pixels may have a color value and a depth value.

The multiview color-depth video 60 captured by the RGB-D camera 21 may be directly input to and stored in the computer terminal 30, and may be processed by the dynamic point cloud estimation system 40. Alternatively, the multiview color-depth video 60 may be pre-stored in a storage medium of the computer terminal 30, and the stored color-depth video 60 may be read and input by the dynamic point cloud estimation system 40.

A video may include temporally consecutive frames. For example, when a frame at a current time t is a current frame, a frame at an immediately preceding time t−1 will be referred to as a previous frame, and a frame at t+1 will be referred to as a next frame. Meanwhile, each of the frames may have a color video (or a color image) and a depth video (or depth information).

In particular, the object 10 may be captured at different viewpoints corresponding to a number of the RGB-D cameras 21, and the multiview depth and color videos 60 corresponding to the number of the cameras may be acquired at a specific time t.

Meanwhile, the color-depth video 60 may include temporally consecutive frames. One frame may include one image.

Next, a structure of a point cloud covered by the present invention and a dynamic point cloud will be described.

In order to generate and represent a three-dimensional (3D) space or object, volumetric visual data capable of representing geometric information is important. The information may include geometric shape information as well as additional information such as color information, opacity, and normal vectors. When the information is to be temporally represented, information on individual capture instances or motions may be required according to a time sequence. A temporal representation scheme may be broadly divided into a scheme of separately storing information on each instance and a scheme of recording a motion of an object as a function of time. The former is similar to an operation of storing still images to generate a video, and the latter is similar to an animating operation of a graphics model. In general, a point cloud is mainly used to represent such information.

A point cloud refers to a set of independent 3D points. Each of the 3D points may include 3D location information, color information, and surface normal information. The point cloud is a more flexible representation scheme than a polygonal mesh because the point cloud may represent non-manifold geometry, and the point cloud may be processed in real time.

Meanwhile, 3D point cloud data has been used in a wide variety of fields. The MPEG PCC standardization activity deals with three categories of point cloud test data. The first is a static point cloud, and the second is a dynamic point cloud with temporal information. The third is a dynamically acquired point cloud. In the MPEG PCC standardization activity, techniques for compressing such point cloud data have been discussed. The data have (x, y, z) coordinates, and have reflectance and RGB properties for each point.

Preferably, data for a person among dynamic point clouds corresponding to the second data type in MPEG PCC will be covered. Just as a temporal sequence of a 2D still image is defined as a video, a dynamic point cloud video may be defined as a temporal sequence of a point cloud.

Next, an overall configuration of a skeleton-based dynamic point cloud estimation system for sequence compression according to the present invention will be described.

The present invention relates to a dynamic point cloud estimation system for compressing a point cloud sequence used as a content in augmented reality (AR) and mixed reality (MR) fields.

In other words, in order to temporally predict a dynamic point cloud for a person, first, a three-dimensional motion of the person may be detected and analyzed. To this end, a 3D skeleton may be used to infer correlation between dynamic point clouds. Skeletons extracted from point cloud frames may be compared with each other to generate a motion vector of the skeleton. A point cloud of a previous frame may be rigged and deformed by using the motion vector to generate a point cloud of a next frame.

An amount of point clouds to be input to a compressor may be reduced through a scheme of obtaining a residual between the estimated point cloud and an original point cloud.

In other words, the amount of point clouds may be significantly reduced through the method according to the present invention, and when a binary encoding scheme is used, compression efficiency may be improved as compared with the related art.

In addition, according to an experiment of the present invention, when comparing a restored point cloud with an original bone, a mean and a standard deviation may have errors of up to 8.84 mm and 6.36 mm, respectively, in a case of a point cloud obtained by capturing a person.

In summary, according to the present invention, the point cloud sequence may be compressed by extracting 3D skeleton information of the point cloud. The skeleton may be based on a deep learning model such as OpenPose for 2D skeleton extraction. Since quality of an extracted 3D skeleton has a great influence on point cloud compression performance, post-refinement for extracting a 3D skeleton with high precision will be used. When the 3D skeleton with the high precision is extracted through the post-refinement, the point cloud may be compressed. The compression may be performed by deforming a key frame point cloud by using a degree of movement of each joint of a skeleton of a non-key frame from a skeleton of a key frame, and removing points overlapping an original bone point cloud. In order to deform the point cloud, a process of converting the key frame point cloud into a mesh and rigging the mesh is required. The key frame may be set depending on a target compression rate.

Next, an overall point cloud estimation method of the skeleton-based dynamic point cloud estimation system for the sequence compression according to one embodiment of the present invention will be described with reference to FIGS. 2A-2B and 3.

According to the point cloud estimation method of the present invention, skeleton information of a person may be used to estimate a motion with respect to the person. First, in a captured dynamic point cloud sequence, a group of point cloud frames (GPCF) may be set, and a point cloud of a first frame will be referred to as a key point cloud (KPC). A quantized point cloud $Q_{t+i}$ may be obtained by spatially quantizing a point cloud of the person acquired in a unit of frames.

A 3D skeleton $SK_{t+1}$ may be obtained from each point cloud by using the scheme as described above. Next, the KPC and 3D motion vectors $MV_{t+i}$ (i>0) between $SK_t$ and the remaining $SK_{t+i}$ (i>0) may be obtained. The 3D motion vectors may be acquired for all joints. All motion-estimated point clouds $EQ_{t+i}$ (i>0) of non-KPCs may be generated by using $MV_{t+i}$ (i>0) and the KPC. The above operation may correspond to rigging and deformation. Finally, a residual $RD_{t+i}$ (i>0) between the motion-estimated point clouds $EQ_{t+i}$ (i>0) and quantized $Q_{t+i}$ (i>0) may be obtained.

Figures 2A, 2B:
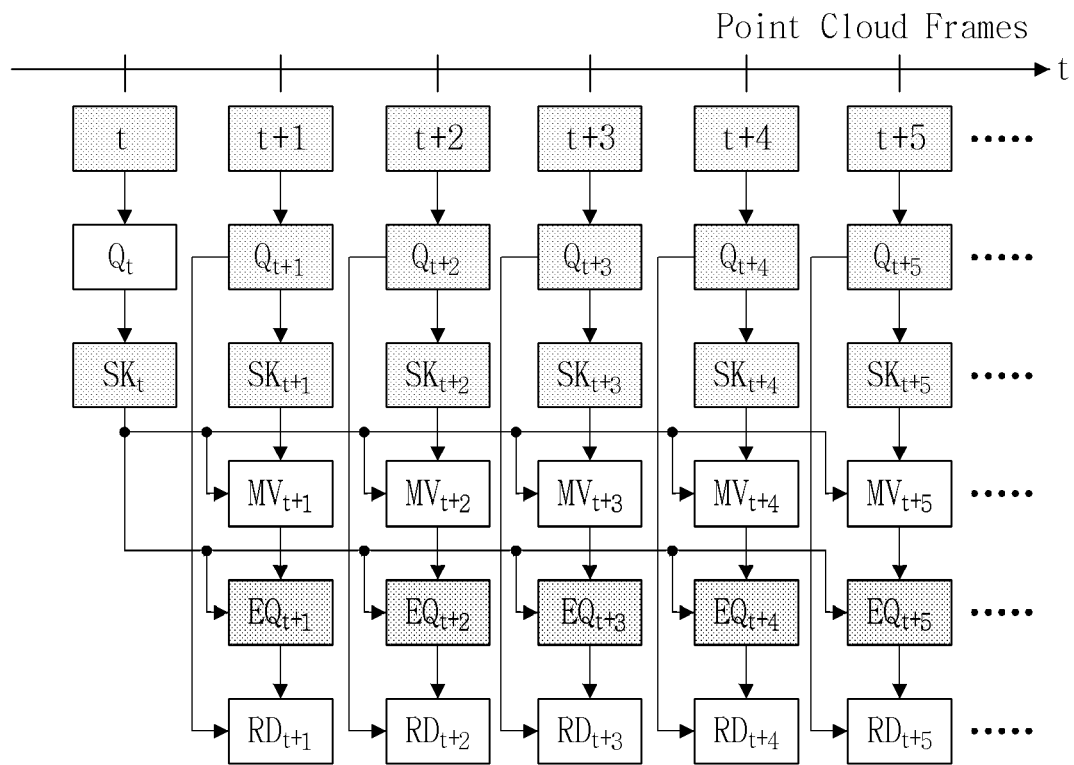
FIGS. 2A-2B are views showing a skeleton-based dynamic point cloud estimation and compensation method for sequence compression according to one embodiment of the present invention.

The above process is shown in FIGS. 2A-2B. FIG. 2A shows an estimation process of a dynamic point cloud sequence, and FIG. 2B corresponds to a compensation process.

Meanwhile, by using a skeleton, in order to transmit and store large-capacity point cloud sequence data, a motion prediction scheme for a point cloud sequence may be configured in consideration of complementary relation between maximization of image quality and minimization of a data amount. In other words, a motion of an object configured as a point cloud may be predicted by using the 3D skeleton, and an amount of point clouds to be used for compression may be reduced by using information on the predicted motion.

In particular, according to the point cloud estimation method of the present invention, in order to facilitate the rigging and the deformation, the point cloud may be converted into a mesh for use in the above two processes. In this case, the point cloud may correspond to a vertex of the mesh.

Meanwhile, according to the point cloud estimation method of the present invention, the point cloud may be estimated by using joint information of the skeleton.

Figure 3:
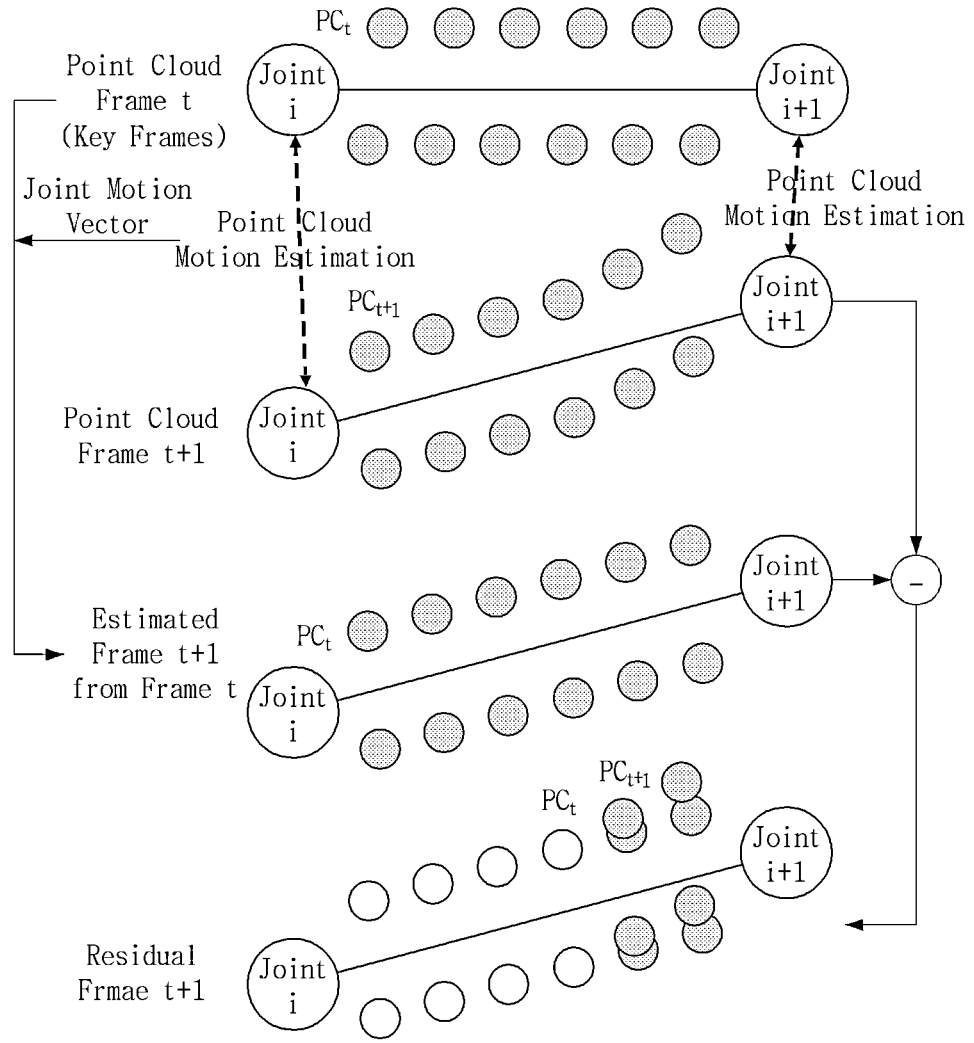
FIG. 3 is a view showing a scheme of generating a residual of a point cloud through motion estimation of a joint according to one embodiment of the present invention.

FIG. 3 illustrates a scheme of estimating a point cloud by using joint information of a skeleton. In an example of FIG. 3, relation between a frame t (Point Cloud Frame t) corresponding to a key frame and a frame t+1 (Point Cloud Frame t+1) corresponding to a non-key frame is shown.

A 3D motion vector between joints of the frame t and the frame t+1 may be calculated. A point cloud of the frame t may be rigged to a position of the frame t+1 by using the motion vector to generate an estimated point cloud of the frame t+1 (Estimated Frame t+1 from Frame t). Even when the motion vector is accurately detected, and correct rigging is performed, a shape obtained through the deformation using the point cloud of the frame t may be different from the point cloud of the frame t+1. In other words, there is an inevitable error between rigged and deformed information and original information. Therefore, the error may be compensated for by a residual frame (Residual Frame t+1).

Next, a configuration of a skeleton-based dynamic point cloud estimation system 40 for sequence compression according to one embodiment of the present invention will be described in detail with reference to FIGS. 4 to 9.

Figure 4:
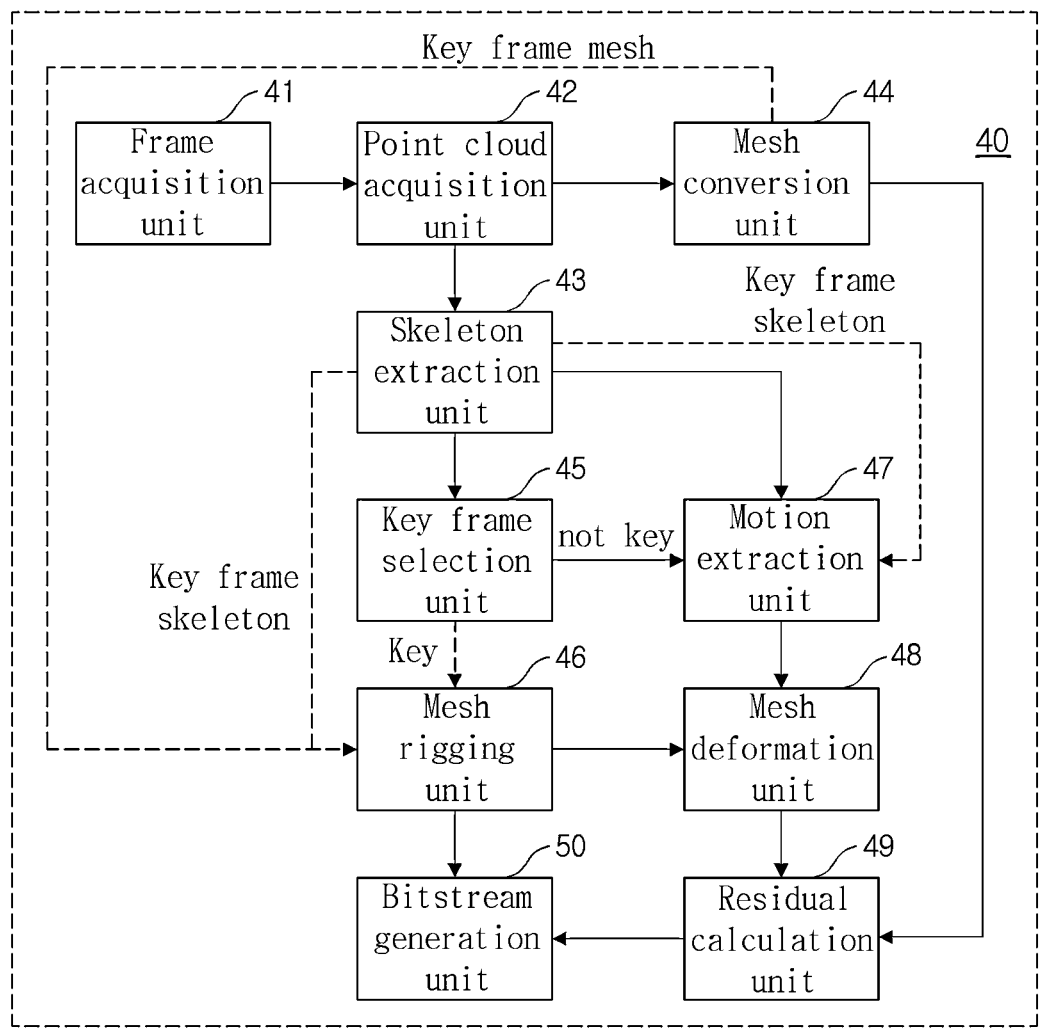
FIG. 4 is a block diagram showing a configuration of a skeleton-based dynamic point cloud estimation system for sequence compression according to one embodiment of the present invention.

As shown in FIG. 4, the dynamic point cloud estimation system 40 according to one embodiment of the present invention may include: a frame acquisition unit 41 for acquiring consecutive frames of a multiview color-depth video; a point cloud acquisition unit 42 for acquiring a 3D point cloud from a multiview frame; a skeleton extraction unit 43 for extracting a 3D skeleton from the 3D point cloud; a mesh conversion unit 44 for converting the 3D point cloud into a mesh; a key frame selection unit 45 for selecting a key frame among the frames or determining whether a frame is a key frame; a mesh rigging unit 46 for rigging a mesh of the key frame to a 3D skeleton of the key frame; a motion extraction unit 47 for extracting a motion vector when a frame is a non-key frame; a mesh deformation unit 48 for deforming the mesh of the key frame by using the motion vector; and a residual calculation unit 49 for calculating a residual between a mesh generated from the point cloud and the deformed mesh. Additionally, the dynamic point cloud estimation system 40 may further include a bitstream generation unit 50 for generating a bitstream by compressing a sequence of the 3D point cloud.

First, the frame acquisition unit 41 will be described.

The frame acquisition unit 41 may acquire a multiview video captured by a multiview color-depth (RGB-D) camera 21. In other words, the multiview color-depth camera system may capture the object 10, and may acquire the captured multiview color-depth image through input or reading.

In order to acquire a dynamic point cloud sequence, an RGB-D camera equipped with a depth and color (RGB) sensor may be used. Since an objective is to generate a volumetric 3D model, eight RGB-D cameras may be installed at various viewpoints of the object.

Prior to generating the 3D model, a point cloud that follows a coordinate system of the depth camera may be acquired by using depth and RGB images captured by the RGB-D camera. The eight RGB-D cameras may be configured by using stand-type photographing equipment. Four sets of stands were arranged in four directions of the object, which are front, rear, and both sides of the object based on all directions. FIGS. 5A-5B show a distributed camera network used in the present invention.

The distributed camera network refers to a system for arranging a plurality of cameras at arbitrary locations in a predetermined space to scan an object. In particular, according to the distributed camera system 20, cameras facing an object may be installed at at least six points (viewpoints) in a horizontal direction, and at least four cameras may be installed at each of the points (viewpoints) while being spaced apart from each other in a vertical direction (an up-down direction). In other words, according to the distributed camera system 20, at least six cameras may constitute one horizontal layer, and at least four horizontal layers may be provided. It is unnecessary to install all cameras in exact locations, and the cameras may be installed in substantially similar locations.

Next, the point cloud acquisition unit 42 will be described.

The point cloud acquisition unit 42 may generate a point cloud of each viewpoint from a color-depth video (or a frame) of each viewpoint, and may match (or integrate) the point clouds of each viewpoint by using a camera parameter of each viewpoint to acquire a matched 3D point cloud. In particular, the matched (integrated) 3D point cloud refers to a 3D point cloud of the object 10.

In addition, the point cloud acquisition unit 42 may acquire the camera parameter of each viewpoint in advance. Preferably, the camera parameter of each viewpoint may be acquired by performing external calibration using a sample image such as a ChArUco board.

In particular, a calibration scheme used in the present invention may be a scheme using feature points to optimize an error between the feature points. Preferably, the ChArUco board may be used to detect a matching point more rapidly and accurately. As an optimization algorithm, a gradient descent scheme may be used.

Coordinates used for optimizing the parameter may be inner corner coordinates of the ChArUco board. A coordinate transformation matrix may include six parameters for rotation and parallel translation about x, y, and z axes. $X_{ref}$ may represent reference camera coordinates, and $X_i$ may represent coordinates of the remaining cameras. A rotation transformation matrix $R_{i \to ref}$ and a parallel translation matrix $t_{i \to ref}$ may initially include a bone matrix. Therefore, conversion relation from $X_i$ coordinates to $X_i'$ coordinates may be represented by Mathematical formula 1.

$$X_i' = R_{i \to ref} X_i + t_{i \to ref}$$ [Mathematical formula 1]

An error function to be used for the optimization may be an average value of a squared Euclidean distance between $X_{ref}$ and $X_i'$. A process of updating a parameter of the error function by the gradient descent scheme may be represented by Mathematical formula 2. In this case, a represents a constant for a learning rate, and is preferably set to be 0.1.

$$P_{n+1} = P_n - \alpha \frac{\partial}{\partial P_n} \left( \frac{1}{N} \sum_{j=0}^{N} \|X_{ref(j)} - X_i'(j)\|_2^2 \right)$$ [Matematical formula 2]

A flow for an overall matching process may start with outputting the depth and RGB images from multiple RGB-D cameras to use the depth and RGB images in the matching. The RGB image may be used to detect the matching point by using the ChArUco board, and the depth image may be used to acquire 3D coordinates of the feature points. Next, a coordinate transformation parameter (a camera parameter or an external parameter) that minimizes a squared Euclidean distance between the acquired coordinates may be acquired through the gradient descent scheme.

Next, the skeleton extraction unit 43 will be described.

The skeleton extraction unit 43 may project the 3D point cloud (integrated point cloud) in a plurality of directions to acquire projection images, may acquire a 2D skeleton image from each of the projection images, and may restore the 2D skeleton images to generate the 3D skeleton. Accordingly, a high-precision 3D skeleton may be extracted.

In detail, when the point cloud is captured through a multiview RGB-D camera system, the point cloud may be projected onto four planes to extract the 3D skeleton. Next, a 2D skeleton of the 2D image obtained through the projection may be extracted by using an OpenPose library. Thereafter, in order to acquire the 3D skeleton, an intersection point may be formed by drawing a straight line from each of joints through a center. In this case, a deep learning scheme such as OpenPose may be used, and other schemes for extracting the 2D skeleton may be applied. Next, the intersection points may be averaged to obtain a joint having 3D coordinates. Finally, a refinement process for extracting the high-precision 3D skeleton may be performed.

FIG. 6 shows a scheme of extracting a 3D skeleton.

First, a front surface of the object may be detected by using principal component analysis (PCA), and the object may be rotated such that the front surface of the object is parallel to an axial direction (S31).

When the 2D skeleton is extracted by inputting the projection image of the point cloud to an OpenPose network, a skeleton extracted from an image obtained by performing the projection from a front direction may have highest accuracy. Therefore, spatial distribution of 3D coordinates of the point cloud may be analyzed to detect the front surface of the object, and the object may be rotated such that a front direction of the point cloud is parallel to a Z-axis direction.

The principal component analysis (PCA) may be used to detect the front direction (see Non-patent literature 4). The PCA may be used to detect principal components of distributed data.

Next, an axis-aligned bounding box may be set, and the projection may be performed onto 2D planes of four side surfaces of the AABB to acquire the projection image (S32).

After detecting the front surface of the object, the AABB for determining a projection plane in a space may be set. The AABB refers to a bounding box of the object, which is generated in an axial direction in a space.

A process of projecting from a three dimension to a 2D plane may be performed by transforming from a world coordinate system to coordinates on the projection plane through a model view projection (MVP) matrix, which is a 4×4 matrix.

Next, the 2D skeleton may be estimated from each of the projection images (S33).

When four projection images are generated, preferably, the 2D skeleton may be extracted by using a deep learning scheme such as OpenPose (see Non-patent literature 5).

Next, the 3D skeleton may be generated by calculating a joint intersection point between the projection images (S34).

In other words, each 2D skeleton pixel coordinate system may be restored to a 3D coordinate system. In this case, joint coordinates extracted on four projection planes located in the space may be calculated. When matching coordinates on the four planes are connected to each other, four coordinates intersecting in the space may be obtained.

Among the four coordinates, coordinates having a distance greater than or equal to a predetermined threshold distance (e.g., 3 cm) from other coordinates may be determined as coordinates including an error so as to be removed. The 3D skeleton may be acquired through an average value of candidate coordinates that have not been removed.

Figure 7:
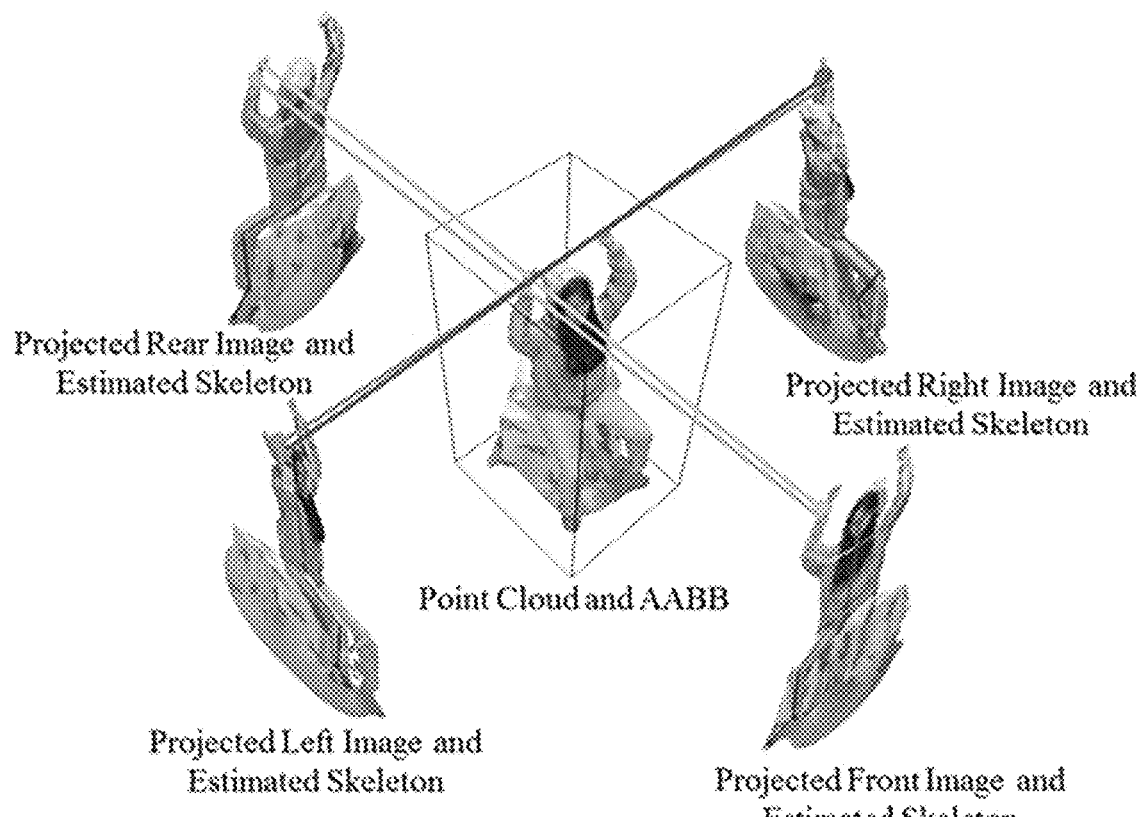
FIG. 7 is view illustrating extraction of a 3D joint of a left shoulder of a point cloud according to one embodiment of the present invention.

FIG. 7 illustrates an operation of extracting a 3D joint of a right wrist.

Next, the mesh conversion unit 44 will be described.

The mesh conversion unit 44 may convert the 3D point cloud into a mesh.

Preferably, the mesh conversion unit 44 may quantize the 3D point cloud, and may convert the quantized point cloud into the mesh. More preferably, the point cloud quantization may be performed by using an octree structure.

A captured point cloud may have very precise floating point coordinates. In addition, when the multiview camera is used, a plurality of point clouds may exist at the same location. Due to high precision and spatial redundancy of the point cloud, it may be difficult to match coordinates of a rigged point cloud and coordinates of an original point cloud. Therefore, the quantization of spatial coordinates of the point cloud may be required.

An octree refers to a three-dimensional extension of a quadtree, and may have a hierarchical tree structure in which a parent node is connected to eight child nodes. An octree algorithm may be used for the quantization of the point cloud. The point clouds distributed in a three-dimensional space may be quantized by using the octree structure, so that the precision may be restricted, and the redundancy may be removed as much as possible.

Figure 8:
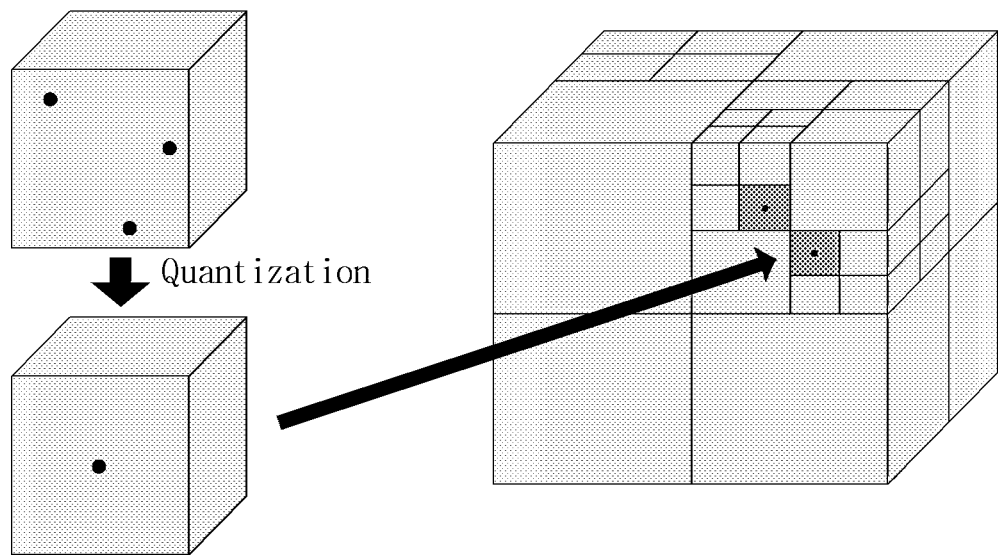
FIG. 8 is a view showing spatial quantization of a point cloud by using an octree according to one embodiment of the present invention.

In particular, a minimum unit of a voxel defining an octree space may be set to 1 mm$^3$. FIG. 8 shows a process of quantizing a point cloud through an octree structure. When a voxel for a point cloud is divided, all point clouds inside the voxel may be converted into center coordinates of the voxel.

Meanwhile, the quantized point cloud may be converted into the mesh. Preferably, the point cloud may be converted into the mesh by using Poisson surface reconstruction.

Next, the key frame selection unit 45 will be described.

The key frame selection unit 45 may select a key frame among a series of consecutive frames, or may determine whether a frame is the key frame.

Preferably, the key frame selection unit 45 may select a first frame as a key frame, and may select a key frame among frames (or target frames) according to a predetermined rule. A target frame that is not selected will be referred to as a non-key frame.

For example, the key frame selection unit 45 may set key frames at regular intervals. In other words, the key frame may be arbitrarily set, or frames at regular intervals may be set as the key frames. In this case, a key frame of the non-key frame (an intermediate frame) refers to an immediately preceding key frame. As another example, the key frame may be determined according to a size of a motion of the skeleton. In other words, when the skeleton moves more than a threshold value, or when the motion of the skeleton may not be measured, a current target frame may be selected as the key frame.

Depending on whether a target frame is the key frame or the non-key frame, tasks such as mesh rigging, motion estimation, mesh conversion, and residual calculation may be applied differently to the target frame. In other words, when the target frame is the key frame, a rigging operation may be performed on a mesh to a skeleton of the target frame, and when the target frame is the non-key frame, a motion vector may be estimated to deform the mesh of the key frame, and a residual between the mesh of the target frame and the deformed mesh may be calculated.

Next, the mesh rigging unit 46 will be described.

The mesh rigging unit 46 may rig the mesh of the key frame to the 3D skeleton.

In other words, the rigging may be performed on the mesh of the key frame by applying the skeleton of the key frame. The rigging may be performed by a conventional scheme.

The rigging refers to an operation of combining the extracted skeleton with a point cloud or a mesh model. In other words, the rigging refers to an operation of inserting a skeleton into a point cloud to generate movable information.

Next, the motion extraction unit 47 will be described.

In a case of the non-key frame, the motion extraction unit 47 may calculate a skeleton motion vector (or a 3D motion vector) from the skeleton of the key frame and a skeleton of the non-key frame. In other words, skeleton motion estimation may be performed.

Preferably, a difference vector between each of joints of the skeleton of the key frame and a corresponding joint of the skeleton of the non-key frame may be calculated as the motion vector (the 3D motion vector).

In detail, a skeleton or joints of a frame at a time point t may be represented as follows.

$$SK_t = \{J_t(1), J_t(2), \ldots, J_t(n)\}$$

In this case, when the frame at the time point t is the key frame, and a frame at a time point t+i is the non-key frame, a skeleton motion vector $MV_{t+k}$ at the time point t+i may be represented as follows.

$$MV_{t+k} = \{MV_{t+k}(1), MV_{t+k}(2), \ldots, MV_{t+k}(n)\},$$
$$MV_{t+k}(i) = J_{t+k}(i) - J_t(i)$$

Next, the mesh deformation unit 48 may deform the mesh of the key frame by using the motion vector.

In other words, the mesh deformation unit 48 may set the skeleton to have a hierarchical structure, set a skinning weight, and obtain a coordinate transformation matrix so as to deform the mesh by using the skinning weight and the coordinate transformation matrix. In particular, skinning may be performed on the skeleton, and the skinning is preferably performed from a bone in a lower layer.

Figure 9:
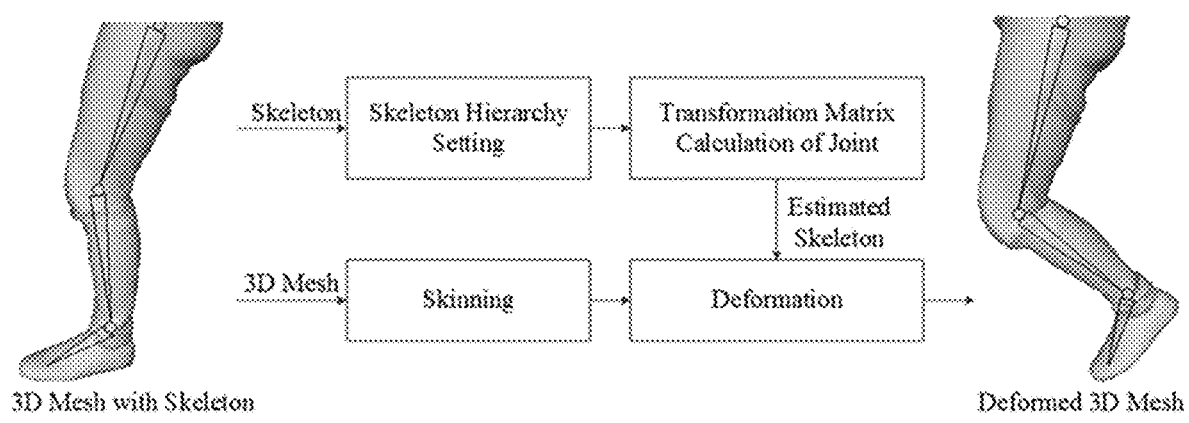
FIG. 9 is a view showing a mesh deformation process according to one embodiment of the present invention.

FIG. 9 shows a mesh deformation process of deforming a mesh by using a 3D mesh and a skeleton.

After generating the mesh, the skinning, which is an operation of attaching skin to the bone, may be performed by using the skeleton. In addition, a transformation matrix indicating degrees of movement of joints and bones of the key frame as compared with joints and bones of the target frame may be calculated by using the motion vectors of the joints. The key frame may be deformed in the form of the target frame by using the transformation matrix of the joints and the skinned object.

When a person moves, a motion of one part may or may not affect a motion of another part. For example, when a thigh is moved upward, a tibia may be affected by a motion of the thigh so as to move upward together with the thigh. However, even though the tibia moves, the thigh does not necessarily move together with the tibia.

Figure 10:
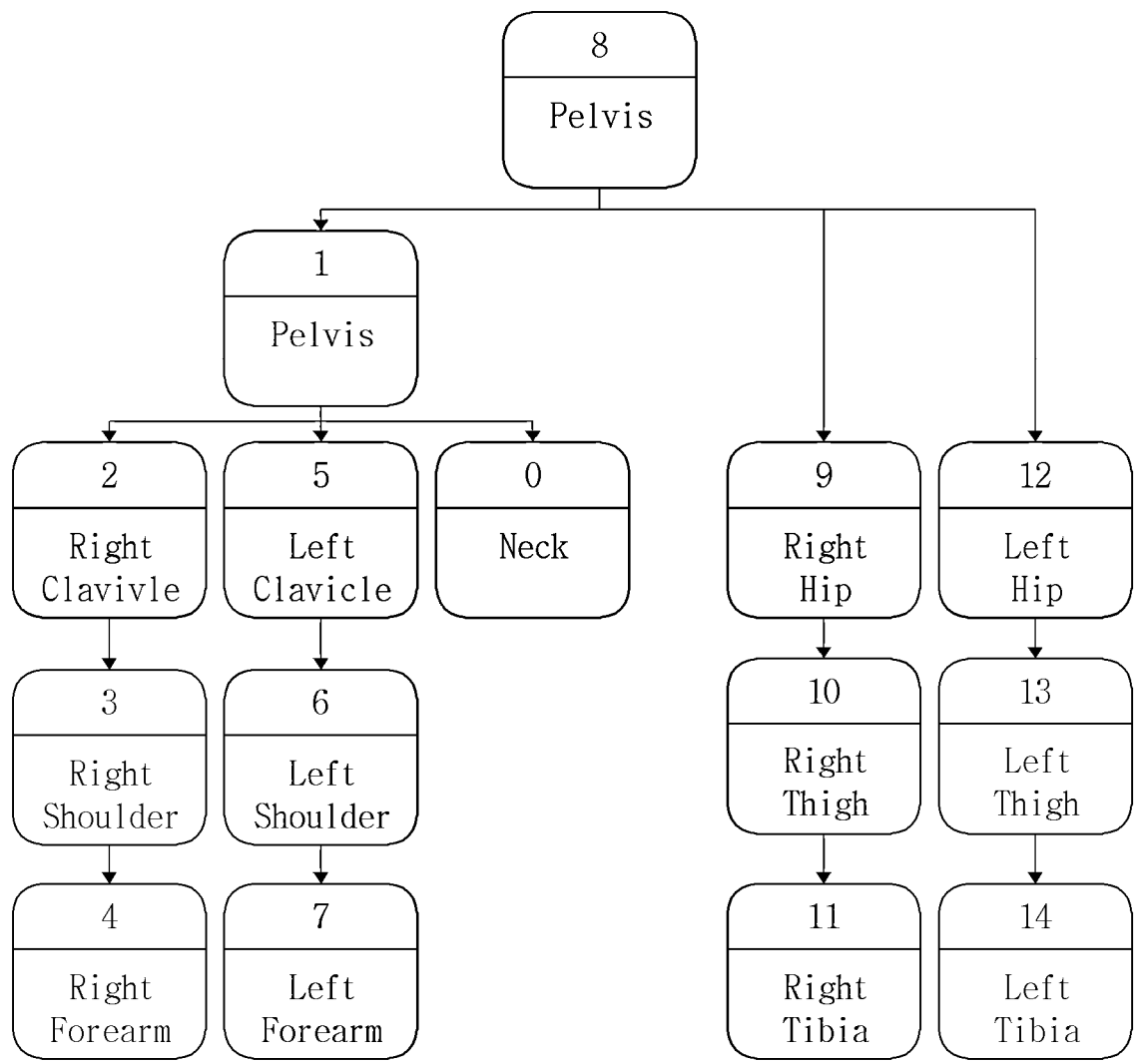
FIG. 10 is a view illustrating a hierarchical structure of joints in a skeleton according to one embodiment of the present invention.

In order to reflect characteristics of various motions, a hierarchical structure may be set in a 3D model so that a lower node may operate together with a motion of an upper node. In an example of FIG. 10, the hierarchical structure of the skeleton may be configured such that a pelvis corresponding to a core is set as a highest node, and as a bone becomes closer to the pelvis, the bone is set as a higher node. FIG. 10 is a view illustrating a hierarchical structure of a skeleton.

The skinning may be performed from the bone in the lower layer based on the set hierarchical structure.

When the mesh is simply divided, and a motion is applied, the mesh may be separated. Therefore, the skinning weight may be used to represent a natural motion. A degree by which the skin is affected by a motion of the bone may be adjusted in proportion to a distance from the joint. In this case, the degree by which the skin is affected may be adjusted by the skinning weight.

Figure 11A:
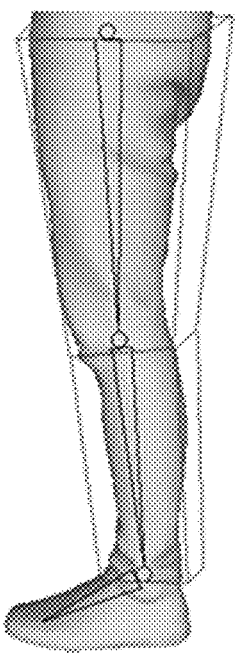
Figure 11B:
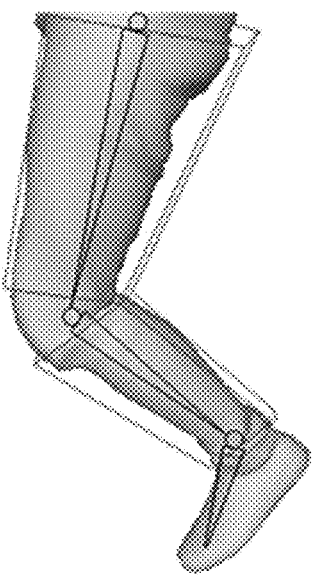
Figure 11C:
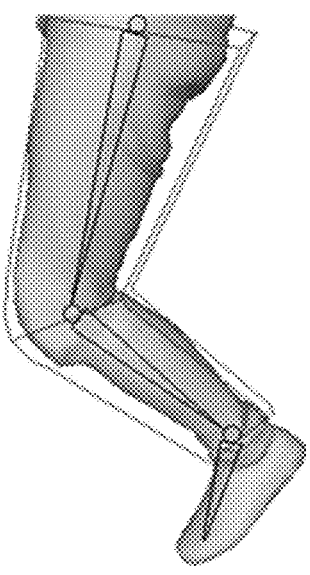

FIGS. 11A-11C show a motion of a mesh before and after applying a skinning weight. FIG. 11A shows a mesh and a skeleton of a key frame to be deformed, and FIG. 11B shows a result of deforming the mesh of the key frame when a skinning weight is not applied. FIG. 11C shows a result of deforming the mesh of the key frame when the skinning weight is applied. The skinning weight having a value between 0 and 1 may become closer to a value of 1 as it becomes closer to a center of the bone, and may become closer to 0 as it becomes closer to the joint.

Figure 12:
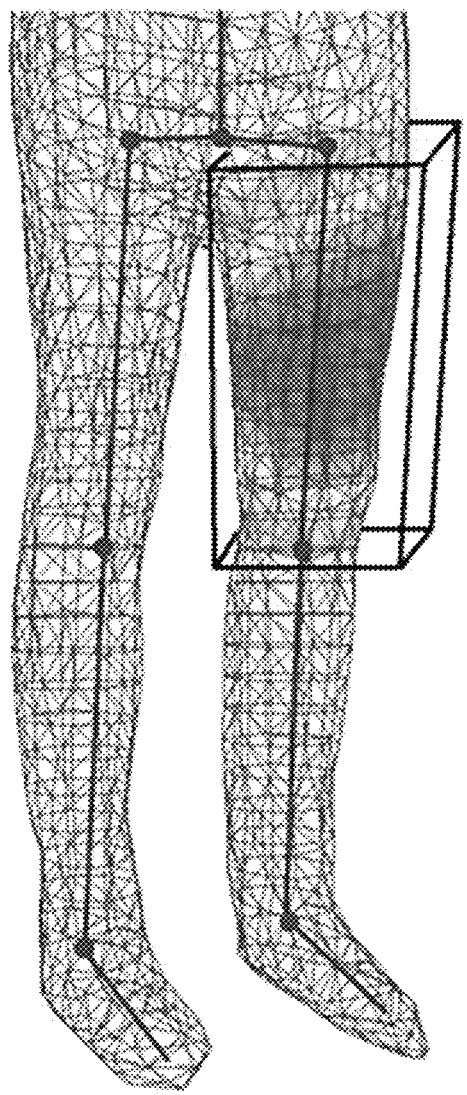
FIG. 12 is a view illustrating a skinning result of a left thigh according to one embodiment of the present invention.

FIG. 12 shows a result of applying a skinning weight to a mesh. A red color represents a value close to 1, and a blue color represents a value close to 0. FIG. 12 shows a result of a left thigh, and all skinning weights may have a value of 0 or more.

When the skinning weight is 0, the point cloud may greatly move according to an amount of movement, and when the skinning weight is 1, the point cloud may rarely move. In other words, when an aim is moved, a point cloud at the center of the bone may be almost consistent, whereas clothes and a structure of a human body may significantly change as it becomes closer to the joint.

Next, a process of calculating the coordinate transformation matrix (RIT) of the joint will be described.

Figure 13:
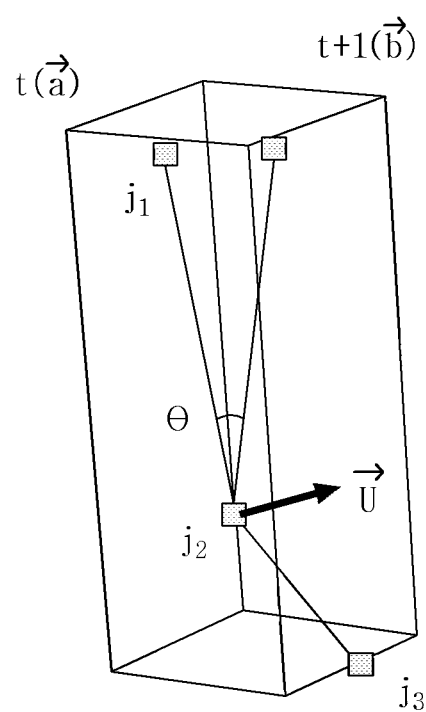
FIG. 13 is a view illustrating skeleton coordinate transformation according to one embodiment of the present invention.

A case where the skeleton moves from a $t^{th}$ frame to a $(t+1)^{th}$ frame is provided. In FIG. 13, $j_1$, $j_2$, and $j_3$ represent joints, respectively. In addition, $t(\vec{a})$ represents a direction vector moving from $j_2$ to $j_1$ in a frame t, and $t+1(\vec{b})$ represents a direction vector moving from $j_2$ to $j_1$ in a frame t+1. A rotation angle $\theta$ represents an angle between $t(\vec{a})$ and $t+1(\vec{b})$, and $\vec{u}$ represents an axis of rotation.

The parallel translation matrix T in the coordinate transformation matrix may be obtained by a coordinate shift value of a joint as shown in Mathematical formula 3.

$$T = j_{2,t+1} - j_{2,t} \qquad \text{[Mathematical formula 3]}$$

The rotation matrix R may be obtained when a rotation angle and an axis of rotation of a bone are known.

Although $j_2$ has been shown in FIG. 13 as being located at the same position in both t and t+1 by assuming that $j_2$ does not move, $j_2$ may move in practice. The rotation matrix R may be calculated by arranging $j_{2,t+1}$ and $j_{2,t}$ at the same position. First, the rotation axis $\vec{u}$ may be obtained through an outer product of $t(\vec{a})$ and $t+1(\vec{b})$ as shown in Mathematical formula 4.

$$\vec{u} = t+1(\vec{b}) \times t(\vec{a}) \qquad \text{[Mathematical formula 4]}$$

The rotation angle may be obtained by applying arccosine to an inner product of $t(\vec{a})$ and $t+1(\vec{b})$ as shown in Mathematical formula 5.

$$\theta = a\cos(t+1(\vec{b}) \cdot t(\vec{a})) \qquad \text{[Mathematical formula 5]}$$

Finally, the rotation matrix R may be obtained by using Mathematical formula 6 including the axis of rotation $\vec{u}$ and the rotation angle $\theta$.

[Mathematical formula 6]
$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_x u_y(1-\cos\theta) - u_z\sin\theta & u_y u_z(1-\cos\theta) + u_x\sin\theta & \cos\theta + u_z^2(1-\cos\theta) \end{bmatrix}$$

In this case, $u_x$, $u_y$, and $u_z$ represent axes of rotation x, y, and z, respectively.

The deformed mesh may be calculated by using the skinning weight and the coordinate transformation parameter. When the skinning weight is denoted by W, the coordinates may be transformed by using Mathematical formula 7. In Mathematical formula 7, X represents coordinates of a point cloud before deformation, and X' represents coordinates after deformation.

$$X' = W(R(X - j_{2,t}) + j_{2,t+1}) \qquad \text{[Mathematical formula 7]}$$

Next, the residual calculation unit 49 will be described.

The residual calculation unit 49 may calculate a residual between the deformed key frame and a target non-key frame. In other words, after the mesh of the key frame is deformed into the mesh of the non-key frame, the residual between the deformed key frame and the target non-key frame may be calculated.

Figure 14A:
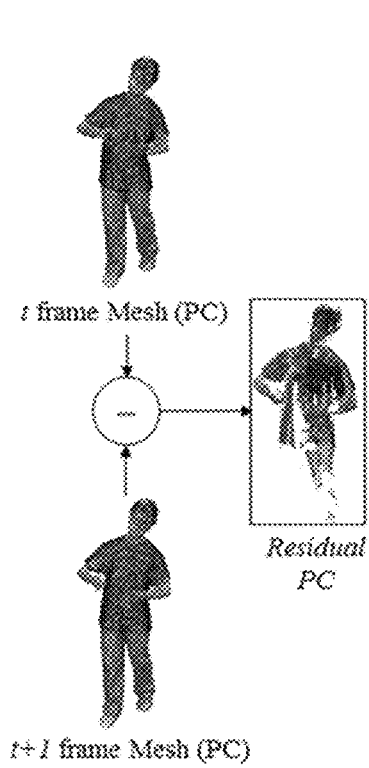
Figure 14B:
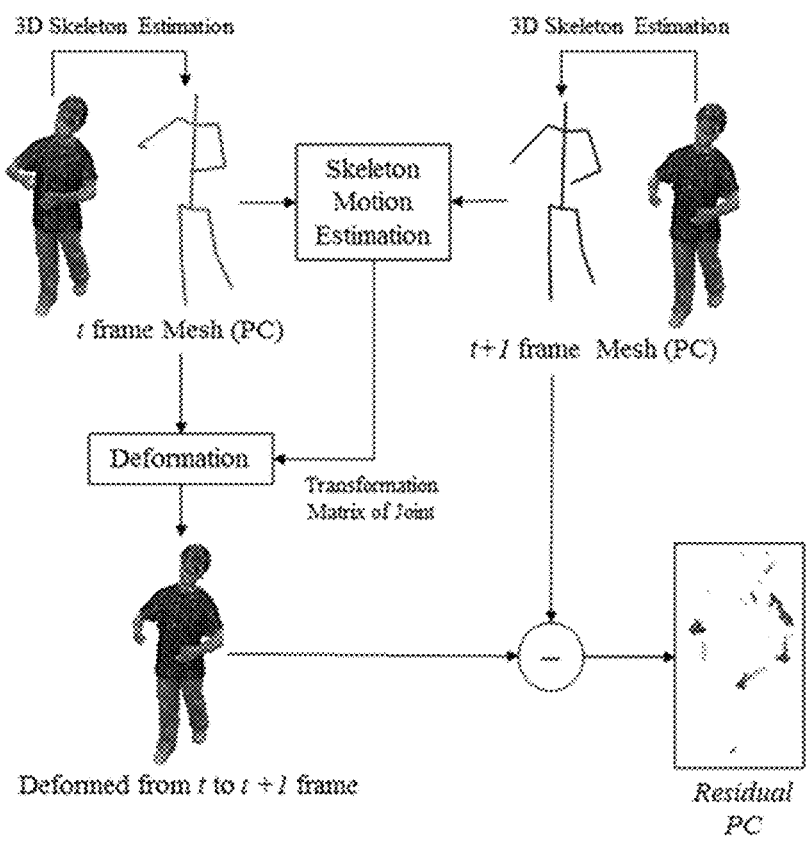

FIGS. 14A-14B show a scheme of calculating a point cloud residual before and after motion prediction. When calculating a residual between an original key frame and the target frame, a result as shown in FIG. 14A may be obtained. However, when calculating a residual between the deformed key frame and the target frame, the residual may include only a very small point cloud as shown in FIG. 14B. FIGS. 14A-14B simply and schematically shows an overall prediction process and a residual calculation process.

In the process of calculating the residual of the point cloud, a number of key frames and a number of non-key frames among all frames may be determined according to a size of the GPCF. The numbers of the frames will affect an overall compression rate. This is because an error of the motion prediction may be increased as a distance between the key frame and the non-key frame increases.

Next, the bitstream generation unit 50 will be described.

The bitstream generation unit 50 may generate the bitstream by compressing the sequence of the 3D point cloud. In other words, after obtaining the residual, lossless compression may be performed by using binary encoding.

Although the present invention invented by the present inventor has been described in detail with reference to the above embodiments, the present invention is not limited to the embodiments, and various modifications are possible without departing from the gist of the present invention.

What is claimed is:

1. A skeleton-based dynamic point cloud estimation system for sequence compression, the skeleton-based dynamic point cloud estimation system comprising:
    a frame acquisition unit for acquiring consecutive frames of a multiview color-depth video;
    a point cloud acquisition unit for acquiring a three-dimensional point cloud from a multiview frame;
    a skeleton extraction unit for extracting a three-dimensional skeleton from the three-dimensional point cloud;
    a mesh conversion unit for converting the three-dimensional point cloud into a mesh;
    a mesh rigging unit for rigging, when a frame is a key frame, a mesh of the frame to a three-dimensional skeleton of the frame;
    a motion extraction unit for extracting, when a frame is a non-key frame, a motion vector from three-dimensional skeletons of the frame and the key frame;
    a mesh deformation unit for deforming a mesh of the key frame by using the motion vector; and
    a residual calculation unit for calculating a residual between a mesh of the non-key frame and the deformed mesh.

2. The skeleton-based dynamic point cloud estimation system of claim 1, wherein the point cloud acquisition unit generates a point cloud of each viewpoint from a color-depth video of each viewpoint, and matches the point cloud of each viewpoint by using a camera parameter of each viewpoint to acquire an integrated three-dimensional point cloud.

3. The skeleton-based dynamic point cloud estimation system of claim 1, wherein the skeleton extraction unit projects the integrated three-dimensional point cloud in a plurality of directions to acquire projection images, acquires a two-dimensional skeleton image from each of the projection images, and restores the two-dimensional skeleton images to generate the three-dimensional skeleton.

4. The skeleton-based dynamic point cloud estimation system of claim 3, wherein the skeleton extraction unit acquires the two-dimensional skeleton image by applying each of the projection images to an OpenPose library.

5. The skeleton-based dynamic point cloud estimation system of claim 3, wherein the skeleton extraction unit detects a front surface of the object by applying principal component analysis (PCA) to the integrated three-dimensional point cloud, rotates an object such that the front surface of the object is parallel to an axial direction, sets an axis-aligned bounding box (AABB) on the object, projects onto a plane of each side surface of the AABB, acquires the two-dimensional skeleton images from the projection images, restores the two-dimensional skeleton images, forms an intersection point by drawing a straight line from each of joints of the restored images through a center among the restored images, and averages the intersection points to obtain a joint having three-dimensional coordinates.

6. The skeleton-based dynamic point cloud estimation system of claim 1, wherein the mesh conversion unit quantizes an integrated three-dimensional point cloud, and converts the quantized point cloud into the mesh.

7. The skeleton-based dynamic point cloud estimation system of claim 6, wherein the mesh conversion unit quantizes the point cloud by using an octree structure.

8. The skeleton-based dynamic point cloud estimation system of claim 6, wherein the mesh conversion unit converts the point cloud into the mesh by using Poisson surface reconstruction.

9. The skeleton-based dynamic point cloud estimation system of claim 6, wherein the motion extraction unit calculates, as the motion vector, a difference vector between each of joints of a skeleton of the key frame and a corresponding joint of a skeleton of the non-key frame.

10. The skeleton-based dynamic point cloud estimation system of claim 1, wherein the mesh conversion unit sets a skinning weight for the skeleton, obtains a coordinate transformation matrix, and deforms the mesh of the key frame by using the skinning weight and the coordinate transformation matrix.

11. The skeleton-based dynamic point cloud estimation system of claim 10, wherein the skinning weight is set to be closer to a value of 1 as becoming closer to a center of a bone of the skeleton, and set to be closer to 0 as becoming closer to a joint.

12. The skeleton-based dynamic point cloud estimation system of claim 10, wherein the coordinate transformation matrix includes a parallel translation matrix T and a rotation matrix R, and is deformed by Formula 1:

$$X'=W(R(X-j_{2,t})+j_{2,t+1}),$$

wherein X is coordinates of a point cloud before deformation,

X' is coordinates after deformation,

W is a skinning weight, $j_{2,t}$ is coordinates of a joint of a key frame, and $j_{2,t+1}$ is coordinates of a joint of a non-key frame.

* * * * *